United States Patent [19]

Drower

[11] Patent Number: 5,058,926
[45] Date of Patent: Oct. 22, 1991

[54] LAMINATION PRODUCT FOR MANUFACTURE OF IDENTIFICATION CARD

[75] Inventor: Herbert M. Drower, Wilmette, Ill.

[73] Assignee: Transilwrap Company, Inc., Chicago, Ill.

[21] Appl. No.: 498,610

[22] Filed: Mar. 26, 1990

[51] Int. Cl.⁵ ............................................. B42D 15/00
[52] U.S. Cl. ................................... 283/109; 283/107; 283/75; 40/299; 428/916
[58] Field of Search ............... 283/107, 108, 109, 112, 283/904, 74, 75, 77; 40/299, 642; 428/916

[56] References Cited

U.S. PATENT DOCUMENTS

| | | | |
|---|---|---|---|
| 3,068,140 | 12/1966 | Biddle | 283/109 |
| 3,152,901 | 10/1964 | Johnson | 283/904 |
| 3,457,661 | 7/1969 | Peters | 283/109 |
| 3,918,188 | 11/1975 | Drawer et al. | 40/158.1 |
| 4,653,775 | 3/1987 | Raphael et al. | 283/108 |
| 4,907,359 | 3/1990 | Berman | 40/299 |

Primary Examiner—P. W. Echols
Assistant Examiner—David P. Bryant
Attorney, Agent, or Firm—Kinzer, Plyer, Dorn, McEachran & Jambor

[57] ABSTRACT

A two-element lamination product for manufacture of a secure identification card that requires no insert comprises first and second resin lamination sheets, each substantially larger than the desired ID card dimensions, that are joined along one edge; the two sheets have engageable heat-and-pressure sealable surfaces and are precision cut to define two aligned, matching card panels of the desired ID card dimensions. Each card panel is joined to its sheet by plural frangible bridges. The first card panel has a transparent portion and the second an aligned, matching opaque portion with an image-receptive surface facing the first card panel; opacity may be obtained by pigmentation or by surface coating. Usually, the entire first card panel is transparent and the second card panel is all opaque. After ID image data is applied to the opaque part of the second card panel the sheets are sealed together and the sealed card panels are then broken out, affording a secure ID card that is very difficult to separate for alteration purposes.

26 Claims, 3 Drawing Sheets

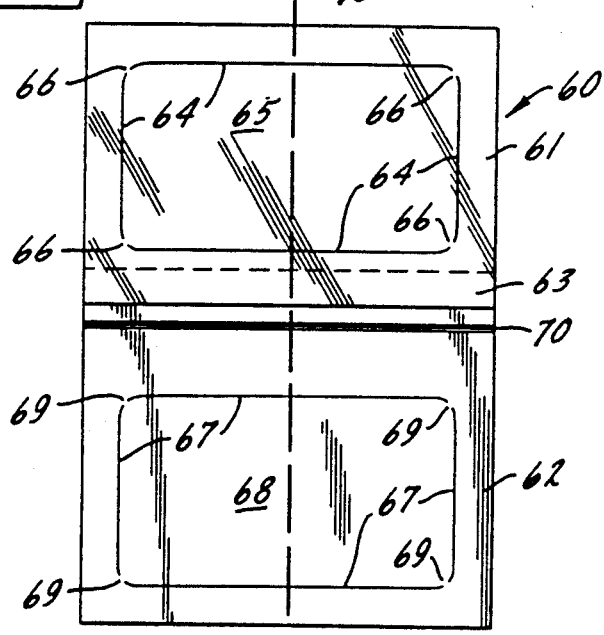
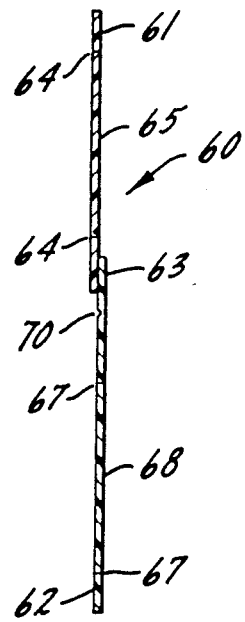
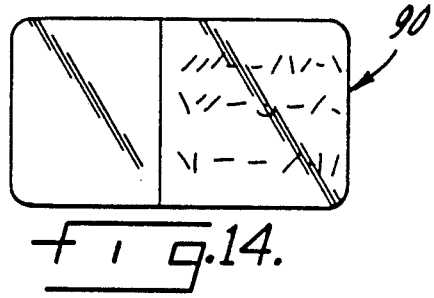

LAMINATION PRODUCT FOR MANUFACTURE OF IDENTIFICATION CARD

BACKGROUND OF THE INVENTION

Laminated plastic identification cards are in widespread use by a variety of different entities; many governmental bodies and corporations regularly issue hundreds of thousands of such identification cards annually. In most instances, the identification card comprises a paper or plastic insert to which identification images (a photograph, handwritten legend, typewritten data, etc.) has been applied, sandwiched between two transparent protective plastic films that are then sealed together under heat and pressure. The protective covering sheets or films are frequently of a composite construction, each having an outer surface layer of a hard, tough, abrasion-resistant polyester and an interior surface layer of polyethylene or other heat-and-pressure sealable resin. In a driver's license or in an identification card used for admission of an individual to a sensitive area, the core or insert may include a photograph. In some systems, all of the identification data on the insert is reproduced by photography.

One recurring problem in the manufacture of laminated plastic identification cards, particularly in small systems where a single card is produced at any given time, pertains to alignment of the core or data sheet within the two protective outer resin films. A variety of different arrangements have been proposed to obtain the necessary alignment so that the cover sheets will afford maximum protection to the core sheet, including pre-formed ridges in the cover sheets, pre-lamination of the cover sheets along one edge, and other expedients. Nevertheless, this particular difficulty continues to recur, especially in systems in which identification cards are produced on an individual basis.

Another continuing problem with laminated resin identification cards pertains to security. Here again, a number of different expedients have been proposed to protect the cards against the usual technique for alteration, which entails careful splitting of the two cover sheets from each other to expose the core sheet so that the data on that sheet can be altered. Some of these expedients work quite well, and others are less effective, but virtually all entail additional cost.

One of the better systems for effective management of the core alignment problem noted above is presented in Drower et al U.S. Pat. No. 3,918,188. In the laminating pouch construction described in that patent, two sheets of protective film material are joined along one edge to form a substantially V-shaped pouch. The two film sheets are each precision cut to form a center panel connected to a rim by a plurality of frangible bridges; the two panels are maintained in accurate registry with each other. An identification card core, bearing appropriate ID data, is inserted into this pouch, after which the two protective sheets are sealed together under heat and pressure. The central portion of the pouch, comprising the two sealed center panels, is then broken out and affords the desired identification card. This arrangement is quite good, in many applications, for maintaining effective alignment of the core within the pouch. On the other hand, it does not provide for a substantial improvement in security as compared with a number of other known arrangements.

SUMMARY OF THE INVENTION

It is a primary object of the present invention to provide a new and improved laminating product for the manufacture of an identification card that does not require any insert or core and that affords effective security characteristics for the ID card.

A more specific object of the invention is to provide a new and improved laminating product for the manufacture of an identification card that incorporates just two elements, a front panel and a back panel, and that affords improved security characteristics but that nevertheless can be completed in virtually any equipment for sealing one layer of plastic film to another, under heat and pressure, ranging from the smallest low-capacity laminator to the largest high-volume laminator.

Accordingly, the invention relates to a lamination product for manufacture of an identification card of given dimensions, comprising a first sheet and a second sheet, each having surfaces of resin and each sheet being substantially larger than the identification card dimensions, the first and second sheets being joined to each other, along one edge of each sheet, in fixed alignment so that the two sheets can be folded together in surface-to-surface contact, and the contacting surfaces of the two sheets, when folded together, being heat-and-pressure sealable to each other. The first and second sheets are precision cut to define first and second matching identification card panels each having the predetermined identification card dimensions, the first and second identification card panels being accurately aligned with each other and in surface-to-surface contact when the two sheets are folded together. Each card panel is joined to the remainder of its sheet by a plurality of frangible bridges; at least a given data viewing portion of the first card panel is transparent and a matching data display portion of the second card panel is opaque, the data display portion of the second card panel having an image-receptive surface facing the viewing portion of the first card panel. The first and second sheets are adjustable, relative to each other, to expose the image-receptive surface of the data display portion of the second card panel for application of image data thereto without disruption of the alignment of the two sheets.

BRIEF DESCRIPTION OF THE DRAWINGS

FIG. 9 is a plan view of a lamination product according to another embodiment of the invention;

FIG. 10 is a sectional view of the lamination product taken approximately along line 10—10 in FIG. 9;

FIG. 11 is a plan view of a lamination product according to a further embodiment of the invention;

FIG. 12 is an end view of the lamination product of FIG. 11; and

FIGS. 13 and 14 are plan views of opposite sides of a finished ID card made from the lamination product of FIGS. 11 and 12.

In each of FIGS. 2, 6, 7, 7A, 10 and 12 the thickness of the elements of the illustrated lamination products have been greatly exaggerated to aid in the description and comprehension thereof.

DESCRIPTION OF THE PREFERRED EMBODIMENTS

Figure 1:
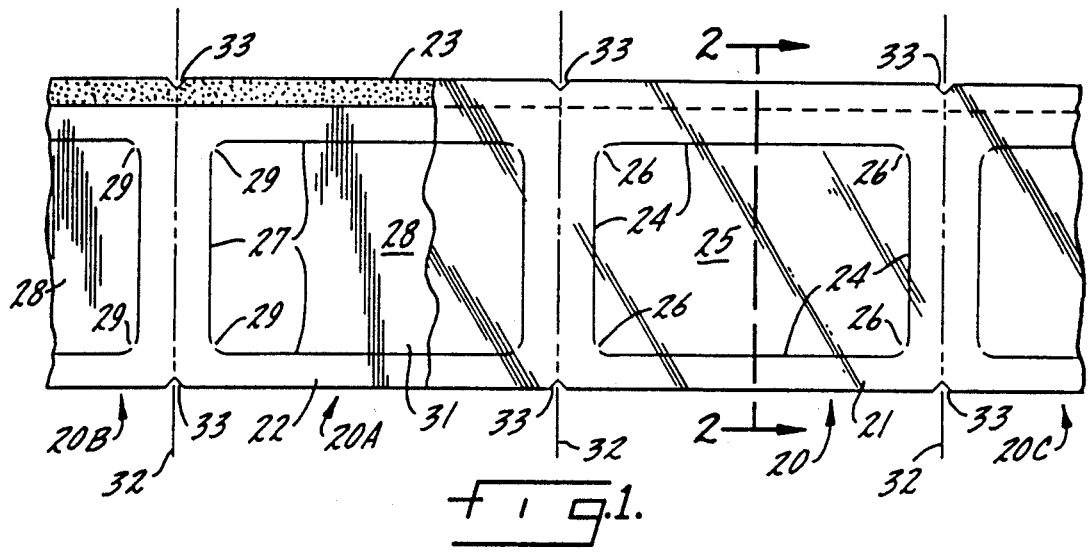
FIG. 1 is a plan view of a strip assembly of a plurality of lamination products according to one embodiment of the invention.

FIG. 1 illustrates a series strip of lamination products 20, 20A, 20B, and 20C according to a first embodiment of the present invention. All of the lamination products 20, 20A, 20B and 20C have the same construction. This sequence of lamination products comprises a first sheet 21 of transparent resin material, usually a heat-sealable laminate that is joined to a second sheet 22 of resin material, again preferably a heat-sealable laminate, along a bond edge 23. There are a series of aligned notches 33 in the first and second sheets 21 and 22 to afford alignment means for severing the individual lamination products 20, 20A, 20B, and 20C from each other as indicated by the phantom lines 32. Notches 33, pin holes, or other means may be used as guides for feeding the lamination products through a press, camera, printer or any other apparatus for applying identification data images to portions of the second sheet 22 as described hereinafter.

Figure 2:
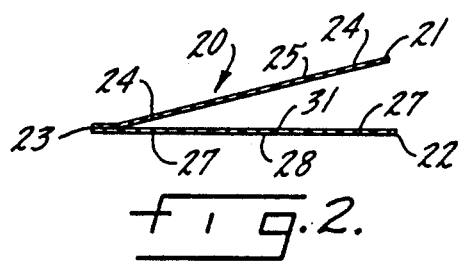
FIG. 2 is a sectional view taken approximately as indicated by line 2—2 in FIG. 1.
Figure 3:
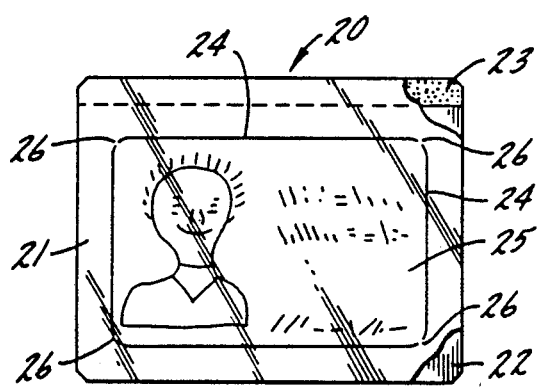
FIG. 3 is a plan view of one lamination product from the strip of FIGS. 1 and 2, after printing and folding.

As shown in FIGS. 1–3, the two extended resin sheets 21 and 22 comprising lamination products 20, 20A, 20B, and 20C are joined together along the edge 23 of each sheet in fixed alignment so that the two sheets can be folded together in surface-to-surface contact. This relationship is most apparent in FIG. 2. Further, the contacting surfaces of the two sheets 21 and 22, when folded together, are heat-and-pressure sealable to each other.

Sheets 21 and 22, FIGS. 1–3, are both precision cut to define matching identification card panels each having the predetermined dimensions desired for a finished identification card. Thus, as best shown in FIG. 1, the first sheet 21, in this instance formed of a transparent resin laminate, is die cut or otherwise precision cut along a series of lines 24 defining a generally rectangular first card panel 25 having rounded corners 26. Panel 25 is not entirely separated from the surrounding portion of sheet 21 by cuts 24. Instead, there are four frangible bridges that remain uncut in sheet 21, as indicated at points 26, one bridge in each corner of the first card panel 25. Similarly, as best illustrated in connection with lamination product 20A in FIG. 1, the lower, opaque sheet 22 is die cut or otherwise precision cut along four rectangularly arranged lines 27 to define a second card panel 28, in sheet 22, that remains connected to the surrounding portion of the sheet by four frangible bridges 29 at its corners.

In the embodiment of FIGS. 1–3, lamination product 20 (and each of the other lamination products 20A, 20B, and 20C, etc.) includes a second sheet 22 of material, preferably a resin laminate, that is opaque and that has an image-receptive surface 31 facing the card panel 25 in the first resin sheet 21; see FIG. 2. For example, sheet 22 may be formed of heat-and-pressure sealable polyethylene with an appropriate fine-particle white filler (e.g. talc) to afford an upwardly facing surface 31 that is both opaque and image-receptive. The opposite, outer surface of sheet 22 may be covered by a film of a hard, tough, abrasion-resistant polyester resin, laminated to the pigmented polyethylene. Sheet 21, on the other hand, should be transparent and may comprise a conventional laminating film having an outer surface of a hard, tough, abrasion-resistant polyester resin bonded to an inner surface of polyethylene or other heat-and-pressure sealable resin. The edge bond 23 between the two sheets 21 and 22 may be a simple adhesive bond; alternatively, a heat seal may be utilized to join the first and second sheets 21 and 22 along the bond edge 23.

To use lamination product 20 in the manufacture of an identification card, the first sheet 21 is folded back to expose the image-receptive surface 31 of the second sheet 22. Of course, this assumes that the bond at edge 23 is adequate to permit the top or first sheet 21 to be folded back out of the way. Sheet 21 may be scored (not shown) to facilitate folding it out of the way without otherwise altering its alignment with sheet 22. An identification image is then applied to the upwardly facing surface 31 of the card panel 28 that occupies most of the center space of sheet 22 in lamination product 20. The identification data image may be applied by typing or otherwise imprinting identification data on surface 31. On the other hand, surface 31 may be coated with an appropriate photographic emulsion so that the identification data image may be applied thereto photographically.

After the desired identification data image has been applied, photographically or otherwise, to the surface 31 of the second identification card panel 28 in the opaque resin sheet 22, the first or top resin sheet 21 is folded back over sheet 22 until the two sheets are in surface-to-surface contact. When this is done the two card panels 25 and 28 are accurately aligned over each other. The lamination product 20 is then passed through a conventional laminating press, which may be a rotary press or a flatbed press, to seal the two sheets 21 and 22 together under heat and pressure. Of course, the principal components of the two sheets, comprising the card panels 25 and 28 are sealed together in the course of this lamination procedure. Thereafter, the sealed card panels 25 and 28 may be readily broken out of the lamination product 20, at the frangible bridges 26 and 29, leaving the identification card 30 illustrated in FIG. 4.

Figure 4:
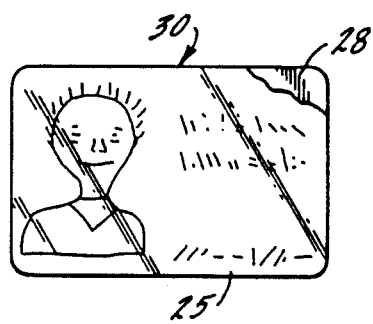
FIG. 4 is a plan view of a finished ID card made from the embodiment of of FIGS. 1-3 and also from the embodiments of FIGS. 5-10.
Figure 5:
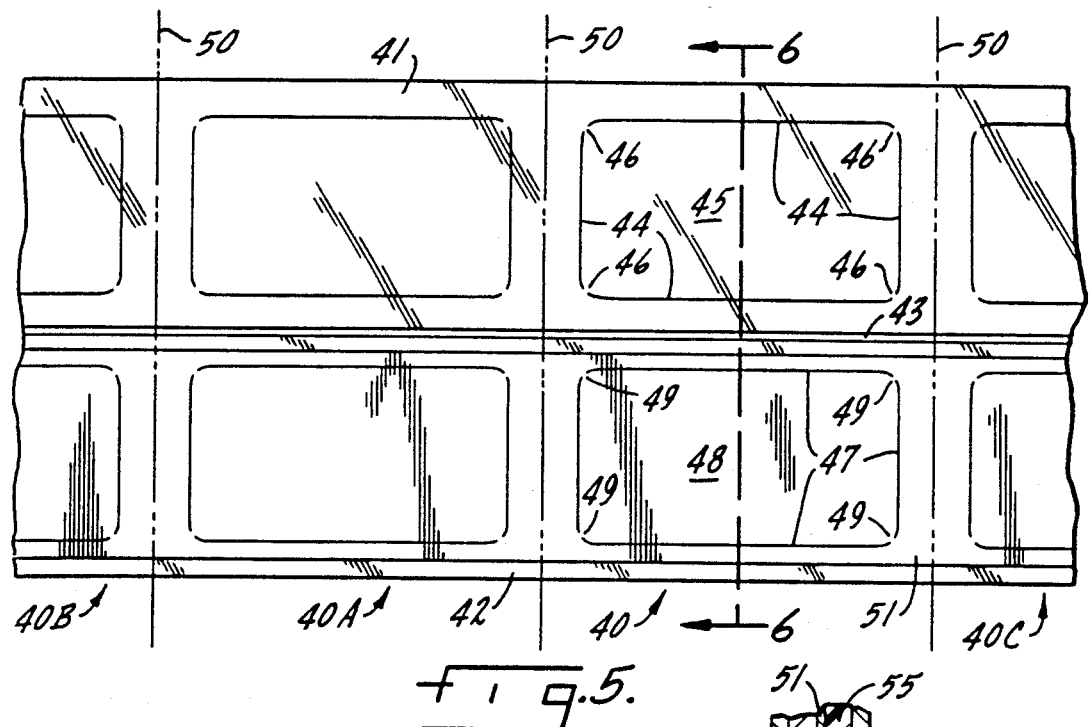
FIG. 5 is a plan view of a strip assembly of a plurality of lamination products according to a second embodiment of the invention.
Figure 6:
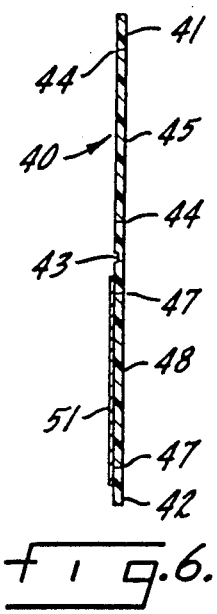
FIG. 6 is a sectional view taken approximately as indicated by line 6—6 in FIG. 5.

Card 30, FIG. 4, provides superior security characteristics in comparison with many previously known cards, including most cards that utilize an insert, whether of paper, resin film, or other material, for the identification image data. Thus, like almost any identification card formed by heat and pressure sealing of resin sheets, it is possible to split card 30 approximately along the sealing surface where the two card panels 25 and 28 (FIG. 2) have been sealed together. But a precise split is difficult and, indeed, almost impossible; it is substantially different from peeling a protective film from an insert sheet. Moreover, in the course of the sealing procedure some of the identification data image on surface 31 of card panel 28 migrates into the mating surface of transparent film card panel 25. Thus, any attempt at alteration becomes quite evident because it is virtually impossible to obliterate the migratory portion of the identification image data from the transparent cover of the card and the splitting of the card almost inevitably modifies the image, as originally formed, so that its appearance is visibly changed. The card 30 produced from lamination product 20 is a secure card, better in this respect than most previously known cards.

As to expense, on the other hand, card 30 is also a substantial improvement over most known identification cards. There is no insert, so that the overall expense is held to a minimum. On the other hand, lamination product 20, from which card 30 is manufactured, can be completed in its processing in essentially any conventional form of laminator, whether a rotary or a flatbed press. Thus, lamination product 20 is adaptable to use in a high volume system, processing a long strip of products 20, 20A, 20B, 20C, etc. (FIG. 1). On the other hand, individual lamination products, such as product 20, when severed from the strip, can be utilized to produce one identification card at a time, still at minimum expense.

Figure 7:
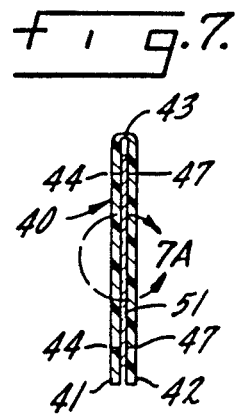
FIG. 7 is a sectional view like FIG. 6 but with the lamination product folded.

FIGS. 5-8 illustrate another embodiment of the invention; in this instance, the starting material is an elongated sheet of transparent, heat-and-pressure sealable resin that is divided, by a longitudinal hinge section 43 of reduced thickness, to afford a first sheet 41 and a second sheet 42. The thin hinge section 43, along one edge of each of the two sheets 41 and 42, maintains those sheets in fixed alignment; they can be folded together in surface-to-surface contact as illustrated in FIG. 7. The contacting surfaces of the two sheets, when folded together, are heat-and-pressure sealable to each other. The composite construction shown in FIG. 5 can be severed, along lines 50, to provide individual lamination products 40, 40A, 40B, and 40C.

The first sheet 41 is precision cut, as indicated by lines 44, to define a first rectangular identification card panel 45, preferably having rounded corners. Similarly, the second sheet 42 is precision cut to define a second identification card panel 48, the cut lines being indicated at 47. As will be apparent from FIGS. 5-7, when sheets 41 and 42 are folded together the first and second identification card panels 45 and 48 are accurately aligned and in surface-to-surface contact. Each of the first card panels 45 is joined to the remainder of its sheet 41 by a plurality of frangible bridges 46, preferably one at each corner. In the same manner, the second card panel 48 is joined to the remainder of the second sheet 42 by four corner-located frangible bridges 49.

In the embodiment of FIGS. 5-8, the first and second sheets 41 and 42 are formed of a single, continuous, transparent resin laminate. Preferably, that laminate includes an outer layer of a hard, tough, abrasion-resistant polyester bonded to a heat-and-pressure sealable layer of polyethylene or like resin. Because the laminate is transparent, it is necessary to apply a surface coating 51 to the second sheet 42 so that each of the second card panels 48 will have an image-receptive surface of opaque character facing its related first card panel 45 when the lamination product of which the two card panels are a part is folded as shown in FIG. 7.

Figure 8:
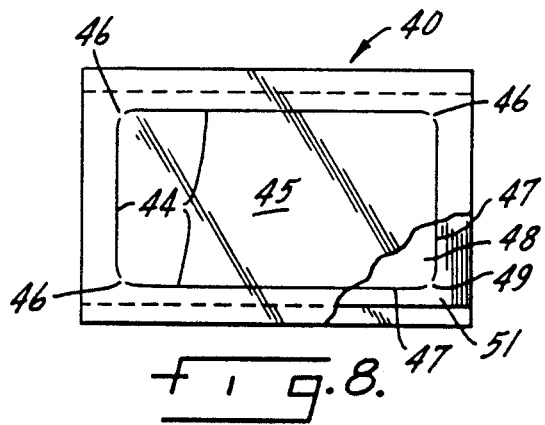
FIG. 8 is a plan view of one lamination product from the strip of FIGS. 5-7 after printing and folding.

The use of a lamination product from this second embodiment of the invention, such as lamination product 40 of FIGS. 5-8, is much the same as for the first embodiment. Thus, identification image data is imprinted, photographed, or otherwise applied to the second card panel 48 of the lamination product, on the surface facing the first card panel, the surface bearing coating 51. In this regard, it may be noted that coating 51 may be a photographic emulsion. After the identification image data is in place, the lamination product is folded over as shown in FIGS. 7 and 8. The lamination product is then subjected to heat and pressure, usually in a conventional laminating press of the rotary or flatbed type, sealing sheets 41 and 42 together and consequently sealing card panel 45 in aligned relation onto card panel 48. Thereafter, the frangible bridges at the corners of the card panels are broken to release the identification card, which has essentially the same construction as the card 30 of FIG. 4.

Figure 7A:
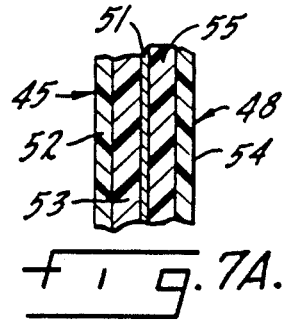
FIG. 7A is an enlarged detail sectional view of the part of FIG. 7 labelled 7A.

The detail sectional view, FIG. 7A, shows the layers that appear in the lamination product and in the finished identification card. Thus, the two outer layers 52 and 54 of the card panels 45 and 48, respectively, each constitute a thin film of a hard, tough, abrasion-resistant polyester. Each of these outer films 52 and 54 is bonded, by extrusion or otherwise, to a sealing layer. Thus, for protective film 52 there is a bonded sealing layer 53 of polyethylene or other appropriate resin, whereas for polyester film 54 there is a similar bonded layer 55 of polyethylene or other heat sealable resin. The opaque coating 51 on panel 45 ends up sandwiched between the two as shown in FIG. 7A. If desired, the coating 51 could be located between layers 54 and 55 if layer 55 is of image-receptive resin.

FIGS. 9 and 10 illustrate another embodiment of the invention, shown as a single lamination product 60. The lamination product 60 includes a first resin sheet 61 that is bonded to a second resin sheet 62 along one edge of each of the two sheets as indicated at 63. This is usually an adhesive bond, although a heat seal bond could be used depending upon the suitability of the materials contacting each other from the two sheets 61 and 62. Each of these sheets 61 and 62 is substantially larger in area than the identification card to be made with lamination product 60. A groove or notch 70 may be formed in sheet 62 to facilitate folding the two sheets together in accurate alignment.

The first sheet 61 in lamination product 60 is die cut along a plurality of cut lines 64 to afford a first card panel 65 having a generally rectangular outline but with rounded corners. Panel 65 remains connected to the balance of sheet 61 by a series of frangible bridges 66, again preferably located at the card corners. Similarly, the second sheet 62 of lamination product 60 is die cut along a series of lines 67 to provide another generally rectangular card panel 68. This second card panel 68 remains connected to the balance of sheet 62 by a plurality of frangible bridges 69 in the rounded corners of the panel.

In the fabrication of lamination product 60, FIGS. 9 and 10, two resin sheets having somewhat different characteristics are employed. Thus, the first sheet 61 is a transparent lamination film, preferably one which includes an outer polyester layer and an inner heat seal layer of polyethylene or the like. As viewed in FIG. 10, the polyester film would be at the right hand side of sheet 61. As viewed in FIG. 9, the polyethylene or other heat sealable resin would be on the surface facing outwardly of the drawing.

The second sheet 62 of lamination product 60 is preferably opaque. It, too, may be formed of a composite of a polyester outer layer and a polyethylene or other heat sealable inner layer. The orientation is the same as for film 61, with the polyester film at the right hand side in the illustration of FIG. 10 and the polyethylene layer facing outwardly of FIG. 9. However, in this instance one of the two layers should be pigmented so that it will be opaque to afford an appropriate background for an identification data image. Usually, opacity is achieved by a dispersion of pigment in the heat sealable layer. Alternatively, it could be effected by a coating as described in connection with the embodiment of FIGS. 5-8.

Use of lamination product 60, FIGS. 9 and 10, is the same as described above as for other embodiments of the invention. Identification image data is imprinted, photographed, or otherwise applied to the card panel 68. The lamination product 60 is then folded so that the first card panel 65 effectively covers the identification data on the second card panel 68. This folding operation is facilitated by the notch or score line 70, though the notch may not be essential in all instances. The folded lamination product 60 is then passed through a laminating press to seal the sheets 61 and 62 together, under heat and pressure, which of course seals the two card panels 65 and 68 to each other. Thereafter, the identification card formed by the sealed-together card panels 65 and 68 is broken out of sheets 61 and 62 by breaking the frangible bridges 66 and 69. The end result is a secure but inexpensive identification card corresponding to the card 30 of FIG. 4.

FIGS. 11-14 illustrate a further embodiment of the invention comprising an individual lamination product 80 to be utilized in the manufacture of an identification card 90. The lamination product 80 includes a first sheet 81 and a second sheet 82, each substantially larger than the identification card dimensions. In this instance, sheets 81 and 82 are of integral construction and are joined by a thin hinge segment 83 along the bottom edge of sheet 81 and the top edge of sheet 82. Thus, the two sheets 81 and 82 can be folded over each other in surface-to-surface contact with their contacting surfaces, when so folded, being heat-and-pressure sealable to each other. The sheet material from which sheets 81 and 82 are formed is preferably of composite construction, including a thin polyester film to afford a tough, hard, abrasion-resistant outer surface and a heat sealable inner surface layer of polyethylene or other appropriate heat-ssealable resin. In FIG. 12, the polyester outer surfaces are to the right of the figure; the heat sealable inner surfaces of polyethylene are on the left of the figure.

Because the material from which sheets 81 and 82 are formed is transparent, an image-receptive and opaque coating is applied to at least one of the sheets in order to afford an appropriate background for identification data imaging In the embodiment of FIGS. 11-14, a coating 91 is applied to a part of the first sheet 81 and a similar coating 92 is applied to a complementary part 92 of the other sheet 82. Thus, as shown in FIG. 11, the one edge 93 of coating 91 is precisely aligned with the edge 94 of coating 92. In this way, when the lamination product 80 is subsequently folded, the coating 91 on sheet 81 will be exposed to the remaining transparent portion of sheet 82, whereas the coating 92 on sheet 82 will be exposed to the transparent part of sheet 81.

As in the other embodiments, the first sheet 81 is die cut or otherwise precision cut along a series of lines 84 to afford a first card panel 85 joined to the balance of the sheet by a series of frangible bridges 86. The second sheet 82 is precision cut along a series of lines 87 to define a second card panel 88 joined to the balance of the sheet by a series of frangible bridges 89.

Each of the coatings 91 and 92 defines a data display portion on its card panel. Moreover, each such data display portion of each card panel matches up with a transparent data viewing portion of the other card panel. Consequently, in the embodiment of FIGS. 11 and 12, some of the identification data imaging is applied to the opaque coating 91 that covers a part of the first card panel 85. Another part of the identification data images is applied to the opaque coating 92 that covers a part of the second card panel 88. It should be recognized that some of the image data may also be applied to the transparent portions of the two cards, provided that the exposed surfaces are image-receptive; this applies also to the previously described embodiments.

Processing of lamination product 80, FIGS. 11 and 2, is carried out as described above, so that no repetition is necessary. The end product is an identification card 90 which shows one identification data image on one face of the card, FIG. 13, and another identification data image on the other face of the card, FIG. 14. In all other respects, the card is the same as the card of FIG. 4.

In all embodiments of the invention, precise alignment between the two halves of the identification card is effectively maintained at all times, resulting in a smooth product of finished appearance with even edges. At the same time, cost is held to a minimum because there are only two elements to the complete identification card, formed from the lamination product of the invention, and final processing (sealing) can be effected in virtually any known heat and pressure laminator whether of the rotary or flatbed type. Misalignment of the card panels is quite unlikely, even with a sloppy operator. Nevertheless, the identification cards made with the lamination product of the present invention afford high security characteristics; it is difficult if not impossible to split them in a way that will not distort the identification data image.

I claim:

1. A lamination product for manufacture of a secure identification card of given dimensions that requires no insert, comprising:

a first sheet and a second sheet, each having surfaces of resin and each sheet being substantially larger than the identification card dimensions;

the first and second sheets being joined to each other, along one edge of each sheet, in fixed alignment so that the two sheets can be folded together in surface-to-surface contact;

the contacting surfaces of the two sheets, when folded together, being heat-and-pressure sealable to each other;

the first and second sheets being precision cut to define first and second matching identification card panels each having the predetermined identification card dimensions, the first and second identification card panels being accurately aligned with each other and in surface-to-surface contact when the two sheets are folded together;

each card panel being joined to the remainder of its sheet by a plurality of frangible bridges;

at least a given data viewing portion of the first card panel being transparent and a matching data display portion of the second card panel being opaque, the data display portion of the second card panel having an image-receptive surface facing the viewing portion of the first card panel;

and the first and second sheets being adjustable, relative to each other, to expose the image-receptive surface of the data display portion of the second card panel for application of image data thereto without disruption of the alignment of the two sheets.

2. A lamination product according to claim 1 in which the first and second sheets are both made of transparent resin and an image-receptive coating is applied to the surface of the data display portion of the second card panel facing the data viewing portion of the first card panel.

3. A lamination product according to claim 2 in which the image-receptive coating is an opaque coating that leaves the contacting surface of the second card panel heat-and-pressure sealable to the first card panel.

4. A lamination product according to claim 1 in which:
the second card panel is opaque throughout its area and its entire surface facing the first card panel is image-receptive; and
the first card panel is transparent throughout its area.

5. A lamination product according to claim 4 in which:
the first and second sheets are resin sheets bonded to each other along one edge; and
the second sheet has internal pigmentation that makes it opaque.

6. A lamination product according to claim 4 in which:
the first and second sheets are resin sheets bonded to each other along one edge; and
an image-receptive coating is applied to the surface of the second sheet facing the first sheet and covers at least the card panel in that second sheet.

7. A lamination product according to claim 6 in which the image-receptive coating is opaque.

8. A lamination product according to claim 4 in which the first and second sheets are bonded together along one edge in flat, generally coplanar relation with the contacting surfaces of both sheets facing in the same direction so that the sheets must subsequently be folded to bring the contacting surfaces of the card panels together.

9. A lamination product according to claim 8 in which:
the first and second sheets are resin sheets bonded to each other along one edge; and
the second sheet has internal pigmentation that makes it opaque.

10. A lamination product according to claim 8 in which:
the first and second sheets are resin sheets bonded to each other along one edge; and
an image-receptive coating is applied to the surface of the second sheet facing the first sheet and covers at least the card panel in that second sheet.

11. A lamination product according to claim 10 in which the image-receptive coating is opaque.

12. A lamination product according to claim 4 in which the first and second sheets are bonded together in full overlapping relation with the contacting surfaces of the two sheets facing toward each other so that the sheets must be opened up to permit application of image data to the second card panel.

13. A lamination product according to claim 12 in which:
the first and second sheets are resin sheets; and
the second sheet has internal pigmentation that makes it opaque.

14. A lamination product according to claim 12 in which:
the first and second sheets are resin sheets; and
an image-receptive coating is applied to the surface of the second sheet facing the first sheet and covers at least the card panel in that second sheet.

15. A lamination product according to claim 14 in which the image-receptive coating is opaque.

16. A lamination product according to claim 1 in which the configuration of each card panel is a rectangle with rounded corners and in which each corner of each panel is joined to the adjacent part of its sheet by a frangible bridge.

17. A lamination product according to claim 4 in which the first and second sheets are integral with each other and are joined along said one edge by a hinge strip common to both sheets.

18. A lamination product according to claim 17 in which the hinge strip is thinner than either of the first and second sheets.

19. A lamination product according to claim 1 in which the first and second sheets are integral with each other and are joined along said one edge by a hinge strip common to both sheets.

20. A lamination product according to claim 19 in which the hinge strip is thinner than either of the first and second sheets.

21. A lamination product for manufacture of a secure identification card of given dimensions that requires no insert, comprising:
a first sheet and a second sheet, each having surfaces of resin and each sheet being substantially larger than the identification card dimensions;
the first and second sheets being joined to each other, along one edge of each sheet, in fixed alignment so that the two sheets can be folded together in surface-to-surface contact;
the contacting surfaces of the two sheets, when folded together, being heat-and-pressure sealable to each other;
the first and second sheets being precision cut to define first and second matching identification card panels each having the predetermined identification card dimensions, the first and second identification card panels being accurately aligned with each other and in surface-to-surface contact when the two sheets are folded together;
each card panel being joined to the remainder of its sheet by a plurality of frangible bridges;
a given data viewing portion of the first card panel being transparent and a matching data display portion of the second card panel being opaque, the data display portion of the second card panel having an image-receptive surface facing the viewing portion of the first card panel;
a given data viewing portion of the second card panel being transparent and a matching data display portion of the first card panel being opaque, the data display portion of the first card panel having an image-receptive surface facing the viewing portion of the second card panel;
and the first and second sheets being adjustable, relative to each other, to expose the image-receptive surface of the data display portion of the second card panel for application of image data thereto without disruption of the alignment of the two sheets.

22. A lamination product according to claim 21 in which the first and second sheets are both made of transparent resin and an image-receptive coating is applied to the surface of the data display portion of each of the card panels facing the data viewing portion of the other card panel.

23. A lamination product according to claim 22 in which the image receptive coating is opaque.

24. A lamination product according to claim 21 in which the configuration of each card panel is a rectangle with rounded corners and in which each corner of each panel is joined to the adjacent part of its sheet by a frangible bridge.

25. A lamination product according to claim 21 in which the first and second sheets are integral with each other and are joined along said one edge by a hinge strip common to both sheets.

26. A lamination product according to claim 25 in which the hinge strip is thinner than either of the first and second sheets.

* * * * *